Patented Mar. 31, 1942

2,278,164

UNITED STATES PATENT OFFICE 2,278,164

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application January 25, 1941, Serial No. 375,974

7 Claims. (Cl. 252—338)

This invention relates primarily to the resolution of petroleum emulsions.

One object of our invention is to provide a novel process for resolving petroleum emulsions of the water-in-oil type, that are commonly referred to as "cut oil", "roily oil", "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The chemical compound or composition of matter herein described that is employed as the demulsifier of our process, is a new material representing sulfation derivatives which may be in the form of an ester, a salt, or an acid, but preferably, in one of the two last mentioned forms, and especially the salt form. If a high molal sulfonic acid be indicated by the conventional formula:

R.SO₃H then a hydroxylated ester which may actually have more than one hydroxyl group in the radical which replaces the sulfonic acid hydrogen atom, may be indicated by the following formula:

R.SO₃TOH

If such ester, for instance, the ester derived from ethylene glycol, is treated with sulfuric acid, one then can obtain a sulfate of the sulfonic acid ester, as indicated in the following manner:

The neutralization product derived therefrom by the use of ammonium hydroxide, for example, may be indicated by the following formula:

RSO₃C₂H₄SO₄NH₄

A material of the kind above described illustrates the compounds herein contemplated with certain added provisos:

(a) That the sulfonic acid in the form of a salt or acid, be surface-active, as subsequently defined; and (b) That the ester derived therefrom prior to sulfation be water-insoluble.

As has been indicated, the compounds herein described are derivatives of surface-active sulfonic acids which, generally speaking, are water-soluble, but in some instances, such as in the case of petroleum mahogany acids, may be essentially oil-soluble, although such oil-soluble acids may also show water solubility to a greater or lesser degree, particularly in the form of sodium, potassium, or ammonium salts. Such sulfonic acids have a molecular weight range between 200 and 1,000, and are characterized by the fact that their alkali metal salts are surface-active. By "surface-active" we mean that a relatively dilute solution of alkali metal salts, for instance, the sodium or potassium salt, and also ammonium salt, in a solution containing a few tenths of a percent or thereabouts, will show a marked lowering of the static surface tension, in comparison with distilled water. Where the sulfonic acids or their salts are oil-soluble, surface activity may be indicated by the ability or characteristic property of producing water-in-oil emulsions, and sometimes by the ability to cause oily vehicles to foam or froth. Usually, the acids themselves show the same surface-active property as the salts.

Although the types of compounds employed as the demulsifier in our herein-described process for resolving petroleum emulsions are new chemical products, certain of the raw materials used in the manufacture of said chemical compounds, for example, certain surface-active sulfonic acids, are well known compositions of matter. In order to show the wide range of suitable sulfonic acids, brief reference will be made to a variety of such materials.

More specifically, in the manufacture of compounds of the kind herein contemplated, one may employ as raw materials petroleum sulfonic acids, fatty sulfonic acids, fatty aromatic sulfonic acids, alkylated monocarbocyclic sulfonic acids, alkylated non-hydrogenated dicarbocyclic sulfonic acids, partially or completely hydrogenated alkylated dicarbocyclic sulfonic acids, alkylated polycarbocyclic sulfonic acids containing at least three nuclei, cycloalkylated carbocyclic sulfonic acids free of alkyl radicals, and aralkylated carbocyclic sulfonic acids free of alkyl radicals. In some instances the actual manufacture involves the formation of a salt of a sulfonic acid, rather than a sulfonic acid, as, for example, where sodium bisulfite or sodium sulfite is used as a sulfonating agent. In such instances the sulfonic acid can generally be obtained by some conventional procedure, as, for example, dissolving the sodium sulfonate acid in any suitable low molal alcohol, passing in hydrochloric acid gas with the precipitation of sodium chloride, and the liberation of a sulfonic acid which is usually soluble in the alcoholic medium. The alcoholic solution of the sulfonic acid can be separated from the inorganic salt by filtration, and then the sulfonic acid can be recovered by distillation of the alcoholic solvent.

The sulfonic acids derived from petroleum constitute an important group of acids which may be used as raw materials for the manufacture of compounds or demulsifiers of the type contemplated by our invention. Petroleum sulfonic acids, regardless of whether derived as the principal product of reaction or as the by-product, can be divided into two general types, to wit, green acid or acids, and mahogany acid or acids. The green acids are characterized by being water-soluble or dispersible. Illustrating this type of petroleum acid, reference is made to the following patents, to wit:

U. S. Patent No. 1,395,195, dated January 24, 1933, Limburg; U. S. Patent No. 1,836,429, dated December 15, 1931, Baddiley et al.; U. S. Patent No. 1,955,859, dated April 24, 1934, Osburn et al; U. S. Patent No. 1,836,428, dated December 15, 1931, Baddiley et al.; U. S. Patent No. 1,836,429, dated December 15, 1931, Baddiley et al.; U. S. Patent No. 1,836,430, dated December 15, 1931, Baddiley et al.; U. S. Patent No. 1,836,431, dated December 15, 1931, Baddiley et al.; U. S. Patent No. 1,766,063, dated June 24, 1930, De Groote et al.; U. S. Patent No. 1,909,295, dated May 16, 1933, Luther et al.; U. S. Patent No. 2,042,410, dated May 6, 1936, Pierce; German Pat. No. 550,242, dated May 19, 1932, Chemische Fabrik Pott & Company.

Water-soluble salts of true sulfo-naphthenic acids, i. e., chemical compounds containing a naphthalene nucleus, a sulfonic group, and a carboxy group, represent a suitable type of a break-inducing agent. Such compounds, of course, must be differentiated from sulfo-naphthenes, i. e., the naphthene type of compound containing a sulfonic acid group, but no carboxyl. See British Patent No. 275,267, dated February 4, 1929, to Chemische Fabrik Milch, A. G.

As to the manufacture of oil-soluble petroleum sulfonic acids, see the following:

U. S. Patent No. 2,115,843, dated May 3, 1938, Dawson; U. S. Patent No. 2,158,680, dated May 16, 1939, Retailliau; U. S. Patent No. 2,166,117, dated July 18, 1939, Blumer; U. S. Patent No. 2,168,315, dated August 8, 1939, Blumer; U. S. Patent No. 2,188,770, dated January 30, 1940, Robertson; U. S. Patent No. 2,201,119, dated May 14, 1940, Blumer et al.; U. S. Patent No. 2,203,441, dated June 4, 1940, Oliver; U. S. Patent No. 2,203,443, dated June 4, 1940, Ross; U. S. Patent No. 2,203,440, dated June 4, 1940, Oliver; U. S. Patent No. 2,209,445, dated July 30, 1940, de Mering.

The sulfonic acids derived from fatty acids or fatty materials whose water-soluble salts are contemplated in the present invention, are of the kind which have been frequently employed as fat splitters. Their composition and method of making the same are well understood, and they are available from the usual sources. For the manufacture of fatty sulfonic acids, reference is made to the following patents:

U. S. Patent No. 601,603, dated May 29, 1898, Twitchell; U. S. Patent No. 1,931,491, dated October 24, 1933, Hausman; U. S. Patent No. 1,926,715, dated September 12, 1933, De Groote et al.; U. S. Patent No. 1,988,833, dated January 22, 1935, De Groote et al.

Another type of a suitable fatty sulfonic acid is the type which is characterized by the fact that an aromatic radical is included and that the sulfonic group is directly attached to the aromatic nucleus instead of being directly attached to the hydrocarbon chain of the fatty acid. This type is commonly referred to as a Twitchell reagent. See U. S. Patent No. 628,503, dated July 11, 1899, to Twitchell.

See also "Arylstearic Acids from Oleic Acid," A. J. Stirton and R. F. Peterson, Industrial and Engineering Chemistry, July 1939, pp. 856–858, and "Sulfonated Arylstearic Acids," A. J. Stirton, R. F. Peterson, and P. H. Groggins, Industrial and Engineering Chemistry, August, 1940, pp. 1136–37.

Another class of suitable sulfonic acids which may be employed as raw materials, include the alkylated aromatic sulfonic acids. Although such acids may be derived from monocyclic aromatic compounds, such as cymene or the like, it is preferable that they be derived from polycyclic aromatic compounds, such as naphthalene, anthracene, diphenyl, etc. Generally speaking, it is usually preferable to use naphthalene for various reasons, but particularly due to its low cost. In regard to the uncondensed polycyclic compounds, it is generally desirable to use diphenyl or hydroxy diphenyl. Although reference has been made to compounds derived from naphthalene, it is obvious that similar compounds, i. e., alkylated sulfonic acids, can be derived from any other suitable polycyclic material, condensed or uncondensed, or may be derived from a monocyclic material. The production of alkylated naphthalene sulfonic acids is described in U. S. Patent No. 2,076,623, dated April 13, 1937, to De Groote et al.

In some instances compounds of the kind described are manufactured most expediently from olefines or diolefines, as, for instance, the type illustrated in U. S. Patent No. 2,072,153, dated March 2, 1937, to Bruson et al. In some instances it is particularly desirable to introduce an alkyl radical having more than 10 carbon atoms, and possibly as many as 30 carbon atoms. Such materials may be manufactured in the manner described in U. S. Patent No. 2,083,223, dated January 8, 1937, to De Groote, or as described in U. S. Patent No. 2,161,173, dated June 6, 1939, to Kyrides. See also U. S. Patent No. 2,218,472, dated October 15, 1940, to Kyrides.

For the manufacture of sulfonated alkylated diphenyl compounds, reference is made to U. S. Patent No. 1,901,507, dated March 14, 1933, to Guenther, and U. S. Patent No. 2,135,978, dated November 8, 1938, to Magoun.

As to similar materials having an alicyclic nucleus, and more particularly, an aromatic nucleus, reference is made to the aforementioned Guenther U. S. Patent No. 1,901,507. Similarly, mono-, di-, or triamylated naphthalene, which is an article of commerce, may be hydrogenated and subjected to sulfonation. Another commercially available compound, which is suitable for use is retene sulfonic acid or its sodium salt.

In the manufacture of compounds of the kind previously described, it is not necessary to employ alkyl alcohols, but if desired, alicyclic alcohols, such as cyclohexanol or an aralkyl alcohol, such as benzyl alcohol, may be employed, or the equivalent of cyclohexanol, to wit, a cyclic olefine may be employed. Obviously, if an aralkyl alcohol is employed, for instance, benzyl alcohol and benzene or naphthalene, one obtains in essence a diaryl methane; and it is intended to include in the description of our invention, the use of sulfonated diaryl methanes and their various homologues in the present invention. This type of material is also obtainable in other ways, for instance, condensation of two nuclei by introduction of the methylene bridge or substituted methylene bridge derived from formaldehyde or acetone or similar compounds. In this connection reference is made to U. S. Patent No. 1,336,759, dated April 13, 1920, to Schmidt, and to British Patent No. 467,998, dated December 28, 1935, to Carpmael.

It is well known that sulfonic acids are readily obtained from tallol, rosin, rosin derivatives, and the like. In many instances the same procedure can be applied as is used in the manufacture of sulfonic acids from fatty acids. As to the nature of tallol, which is now available commercially in both the crude and refined types, see Ellis, Chemistry of Synthetic Resins, 1935, volume 1, pages 754, 755. See also U. S. Patent No. 1,961,963, dated June 5, 1934, to De Groote et al.; U. S. Patent No. 1,913,538, dated June 13, 1933, to De Groote et al.; and U. S. Patent No. 1,910,680, dated May 23, 1933, to De Groote et al. See especially, U. S. Patent No. 2,220,678, dated November 5, 1940, to Cromwell & Merley.

As to certain sulfonic acids containing amino or amido linkages, see the following U. S. Patents to Guenther et al., to wit, Nos. 1,932,176, dated October 24, 1933 and Nos. 1,932,180, 1,932,178 and 1,932,177, all dated October 24, 1933.

As to aromatic alkylene ether sulfonates and similar types, see the following: U. S. Patents No. 2,178,831 and 2,178,832, both dated November 7, 1939, to Bruson; U. S. Patent No. 2,178,829, dated November 7, 1939, to Bruson et al.; and U. S. Patent No. 2,184,935, dated December 26, 1939, to Bruson et al.

As to sulfo-dicarboxylic acids which are surface-active, if at least one carboxylic hydrogen atom has been replaced by a hydrophobe group having at least 8 carbon atoms, such as an octyl group or the like, see U. S. Patent No. 2,028,091, dated January 14, 1936, to Jaeger; and U. S. Patent No. 2,176,423, dated October 17, 1939, to Jaeger.

As to patents illustrating other suitable high molal sulfonic acids, which may be employed as raw materials, see the following patents:

U. S. Patent No. 2,110,848, dated March 8, 1938, De Groote; U. S. Patent No. 1,181,172, dated October 4, 1932, Daimler et al.; U. S. Patent No. 1,916,776, dated July 4, 1938, Steindorff et al.; U. S. Patent No. 2,106,242, dated January 25, 1938, De Groote et al.; U. S. Patent No. 2,106,243, dated January 25, 1938, De Groote et al.; U. S. Patent No. 2,110,847, dated March 8, 1938, De Groote.

High molal alcohols, for instance, naphthyl alcohol, can be treated so as to yield a sulfonic acid. Such high molal alcohol sulfonic acid may be employed as a raw material. See U. S. Patent No. 2,000,994, dated May 14, 1935, to Schrauth. See also the following:

U. S. Patent No. 2,061,617, November 24, 1936, Downing et al.; U. S. Patent No. 2,061,618, November 24, 1936, Downing et al.; U. S. Patent No. 2,061,619, November 24, 1936, Downing et al.; U. S. Patent No. 2,061,620, November 24, 1936, Downing et al.; U. S. Patent No. 2,171,117, August 29, 1939, Schrauth et al.; U. S. Patent No. 2,187,338, January 16, 1940, Werntz; U. S. Patent No. 2,187,339, January 16, 1940, Werntz; U. S. Patent No. 1,917,255, July 11, 1933, Harris; U. S. Patent No. 2,170,380, August 22, 1939, Holsten; U. S. Patent No. 1,966,187, July 10, 1934, Schirm.

The method of manufacturing hydroxylated esters of sulfonic acids is well known, although direct reaction between the sulfonic acid and a polyhydric alcohol, such as ethylene glycol, is not applicable, for the reason that one obtains little or no yield of the hydroxylated ester. One procedure contemplates the conversion of sulfonic acid into the sulfonchloride, and subsequently reacting the sulfonchloride with a polyhydric alcohol, with the liberation of hydrochloric acid. Another procedure involves reaction between the sulfonic acid or preferably a salt, such as the sodium salt, and the chlorhydrin, such as ethylene glycol chlorhydrin. Still another procedure for the manufacture of such hydroxylated sulfonic acid esters has been illustrated in some of the patents previously referred to, and particularly, the aforementioned De Groote et al. U. S. Patent No. 2,106,242, dated January 25, 1938. See last three formulas on page 3 of said De Groote et al. patent.

In connection with materials of the kind typified by these formulas, it is desirable to employ a substituted methyl chloride. For instance, one can obtain diamylated naphthalene, triamylated naphthalene, mono-octylated naphthalene, or the like. Such materials can be converted into the substituted naphthyl methyl chloride by the procedure indicated in U. S. Patent No. 2,166,554, dated July 18, 1939, to Roblin.

The preferred way of preparing such materials is to use the procedure described in U. S. Patent No. 2,208,581, dated July 23, 1940, to Hoeffelmann. Briefly stated, the procedure employed is to obtain the free sulfonic acid in an anhydrous state and treat with a compound containing an olefin oxide radical. As typical examples of applicable compounds, may be mentioned glycerine epichlorhydrin, glycide alcohol, ethylene oxide, propylene oxide, butene-2-oxide, butene-1-oxide, isobutylene oxide, butadiene oxide, butadiene dioxide, chloro-prene oxide, isoprene oxide, decene oxide, styrene oxide, cyclohexylene oxide, cyclopentene oxide, etc.

Note, however, that there are certain differences between the procedure employed for the manufacture of the intermediate raw material of the present instance as compared with the procedure, as employed in said aforementioned Hoeffelmann patent. The Hoeffelmann patent contemplates treatment of sulfonic acids, which are not necessarily surface-active, for instance, benzene sulfonic acid, with an olefine oxide, so as to produce materials which are, for the main part, water-soluble and surface-active. It happens that invariably the esters of the high molal sulfonic acids are insoluble in absence of a recurring ether linkage. In order to obtain compounds of the kind herein contemplated, one must stop treatment with the olefine oxide, i. e., oxyalkylation, before water solubility is obtained; and furthermore, it is desirable to stop water solubility at the earliest stage. In other words, the olefine oxide employed, whether ethylene oxide, propylene oxide, butylene oxide, glycidol, methyl glycidol, or the like, is a comparatively expensive reagent; and one is only concerned with obtaining a reactive hydroxyl radical for a subsequent sulfation step. There is no objection to the presence of a recurring ether linkage, provided that the ester is still water-insoluble. This may be illustrated in the following manner, using ethylene oxide as the reactant:

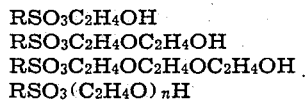

One is interested primarily in obtaining a material of the following type:

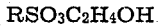

But materials illustrated by any of the three subsequent types:

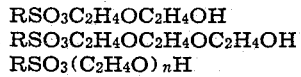

are just as satisfactory, provided that the ester, prior to sulfation is water-insoluble. In some instances, the presence of the recurring ether linkage may give some added desirable characteristic. Ordinarily speaking, one is concerned only with minimum reactant cost; and thus the use of an excess amount of the olefine oxide is not justified. One is not attempting to obtain water solubility by means of the expensive oxyalkylation step. As has been emphasized, the ester obtained must be water-insoluble, regardless of how much or how little alkylene oxide is employed. Generally speaking, 40 moles of alkylene oxide per mole of sulfonic acid may be considered as an upper limit, but obviously solubility is influenced by the alkylene oxide employed. Butylene oxide naturally will not cause a sulfonic acid to be converted into a water-soluble ester as readily as ethylene oxide.

Thus, having obtained hydroxylated water-insoluble esters—and they may be polyhydroxylated and may or may not contain the recurring ether linkage—the next step is to submit them to a conventional sulfation process. The sulfation of such materials is the conventional procedure employed for the sulfation of fatty acids, or fats containing the hydroxyl radical or ethylene linkage, such as oleic acid, olein, ricinoleic acid, triricinolein, monostearin, and the like. A similar procedure is employed in the sulfation of amides derived from fatty acids and hydroxylated amines, such as the stearic acid amide of monoethanolamine. A similar procedure is employed in connection with the sulfation of high molal alcohols and other similar materials. Briefly stated, the procedure consists in treating the material with an amount of sulfating agent at least molecularly equal to the material to be sulfated; and usually the sulfating agent is employed in considerable excess, for instance, from 50% excess to 200% excess, based on molal proportions. Sulfating agents include sulfuric acid of commerce, monohydrate, oleum of various strengths, chlorosulfonic acid, sulfamic acid, etc. Sulfation is generally conducted at a relatively low temperature, from approximately zero degrees C to a temperature of 35-40° or thereabouts. Sulfation can be conducted in the presence of a solvent, such as liquid sulfur dioxide, chlorinated hydrocarbons, dioxane, ethyl ether, propyl ether, etc. Sometimes it is desirable to add materials which tend to take up any water which may be formed, such as organic anhydrides, including acetic anhydride. When sulfation is complete, which is usually indicated by absolutely clear water solubility of the sulfated product, it is generally washed immediately so as to remove the excess sulfating agent. Washing is generally conducted with cold water, chilled brine, or ice. The sulfated material is permitted to separate and the dilute draw-off acid withdrawn. The sulfated mass may be employed as such, or may be neutralized in any convenient manner with any one of the conventional basic materials frequently employed, such as caustic soda, caustic potash, ammonia, various hydroxylated amines, including monoethanolamine, diethanolamine, triethanolamine; and non-hydroxylated amines, including amylamine, benzylamine, cyclohexylamine, and the like. Such materials may be neutralized with polyvalent compounds, such as calcium oxide, magnesium oxide, polyamines, including ethylene diamine, diethylene triamine, triethylene tetramine, etc.

It is to be particularly noted that the procedure herein contemplated is especially valuable in producing desirable materials from comparatively inexpensive sulfonic acids, i. e., sulfonic acids of the type exemplified, water-soluble petroleum sulfonic acids, oil-soluble petroleum sulfonic acids, alkylaryl sulfonic acids derived, for example, from naphthalene and isopropyl alcohol, Twitchell type acids, i. e., sulfoaromatic fatty acids, and low-priced sulfonic acids derived from rosin, modified rosin, and tallol, with or without the addition of aromatic materials.

*Example 1*

Lauryloxy-ethoxy-ethoxy-ethoxy benzene is converted into the sulfonic acid without neutralization, employing the procedure indicated in aforementioned U. S. Patent No. 2,178,830, dated November 7, 1939, to Bruson. The sulfonic acid so obtained is dried by maintaining the same at a temperature to insure fluidity and passing dry carbon dioxide gas through the same to remove the last trace of moisture. One pound mole of the anhydrous sulfonic acid or acids so obtained is treated with 1-3 moles of ethylene oxide in the manner described in the aforementioned Hoeffelmann Patent No. 2,208,581, so as to yield a water-insoluble ester; such ester is sulfated in the conventional manner employed for such type of material with approximately 65% by weight of monohydrate. The sulfation is most conveniently conducted in apparatus designed to mix even solid materials with the sulfating agent. A sulfation temperature of approximately 35-45° C. is employed. The acid is added as rapidly as possible, and as a rule, sulfation can be completed within 2-4 hours. When sulfation is complete, the acid mass should give an absolutely clear, limpid, solution in water. Failure to obtain such clearly soluble sulfated mass is due to either oversulfation or under-sulfation. Oversulfation means that the period of sulfation is too long and decomposition of the sulfated material took place progressively with sulfation. In such case, it is probable that the period of sulfation should be decreased somewhat. Undersulfation can be corrected by increasing the volume of sulfating agent or increasing its activity, for instance, using a mixture of oleum and monohydrate, or else perhaps, extending the period of sulfation slightly. As is understood by those skilled in the art, such sulfation procedure depends on the particular sulfation employed; and there is no difficulty in varying these factors, so as to obtain absolutely water-soluble properties. When sulfation is complete, the mass is washed with cold water, or preferably, with a mixture of chipped ice and water. The amount of water added is preferably equal to the amount of sulfating agent added. The mixture is stirred and allowed to stand the minimum length of time necessary to give a complete separation. Sometimes separation is hastened by the use of a chilled brine instead of water, or by the addition of a solvent, particularly if such solvent is not objectionable in the final product. Such solvent may be a material of the kind exemplified by xylene, kerosene, propyl ether, and the like. After separation is complete, the waste acid is withdrawn and the acid mass neutralized in any convenient manner. Generally speaking, it is our preference to neutralize with ammonia to slightly past the methyl orange endpoint, i. e., until the material shows just the slightest basicity. The product so obtained may be employed for various purposes, and particularly for demulsification.

*Example 2*

Oleyloxy-ethoxy-ethoxy benzene is substituted for lauryloxy-ethoxy-ethoxy-ethoxy benzene in Example 1.

*Example 3*

Cetyloxy-ethoxy-ethoxy benzene is substituted for lauryloxy-ethoxy-ethoxy-ethoxy benzene in Example 1.

*Example 4*

An amido sulfonic acid is employed as, for example, the sulfonic acid derived by the sulfonation of stearanilide. One pound mole of this material is employed to replace one pound mole of the sulfonic acid derived from lauryloxy-ethoxy-ethoxy-ethoxy benzene in Example 1.

*Example 5*

One pound mole of a sulfonic acid of the following composition:

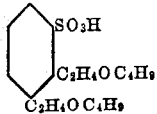

is employed instead of one pound mole of the sulfonic acid derived from lauryloxy-ethoxy-ethoxy-ethoxy benzene in Example 1. (See aforementioned De Groote Patent No. 2,110,848, page 3.)

*Example 6*

The same procedure is followed as in Examples 1–5, inclusive, except that 4–6 moles of ethylene oxide are employed, instead of 1–3 moles.

*Example 7*

The same procedure is followed as in Examples 1–6, inclusive, except that propylene oxide or butylene oxide is substituted for ethylene oxide.

*Example 8*

The same procedure is followed as in Examples 1–7, inclusive, except that an amine of the kind exemplified by monoamylamine, cyclohexylamine, or benzylamine is used as a neutralizing agent instead of ammonia.

It is to be noted that the last example illustrates a type in which the compounds obtained are water-insoluble. Such water-insoluble types are particularly adaptable for many purposes, and in fact, in many instances are just as desirable, or even more desirable for demulsification of certain crude oils than are the corresponding water-soluble types.

It is understood that in all the previous examples, as has been emphasized, the sulfonic acid employed is anhydrous, or substantially anhydrous. Any suitable method may be employed for drying the sulfonic acid, as, for example, a vacuum evaporator of the proper design; or the material may be mixed with a comparatively high boiling solvent, such as xylene, which can be distilled off in a manner to carry along the water, and subsequently permit the combined vapors of xylene and water to be condensed. The condensed xylene is returned to the distillation vessel and the water eliminated by a trap. This is a conventional procedure and requires no further description. In the sulfation step it has been previously pointed out that a solvent may be employed, particularly if the material employed is substantially solid at the sulfation temperature. A class of very suitable solvents includes the chlorinated alkanes, such as chloroform, carbon tetrachloride, trichlorethylene, dichlorpentane, etc. Incidentally, in some instances, particularly where glycidol is used for oxy-alkylation, one may obtain an ester in which more than one acid sulfate radical may be introduced.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

In the hereto appended claims, the word "acyl" is used in reference to the radical $RSO_2$; i. e., one can conveniently consider the sulfonic acid $RSO_3H$ in terms of a formula indicating the acyl group as part of its structure, to wit, $R.SO_2.OH$.

In the hereto appended claims the words "polyhydric alcohol" are used in the conventional sense to include not only materials of the type exemplified by glycerol and ethylene glycol, but also materials of the kind in which the carbon atom chain is interrupted at least once by an oxygen atom, as for example, diethylene glycol, diglycerol, etc.

It may be well to emphasize that the compounds of the kind herein contemplated may be manufactured by any suitable method; and it is not intended to limit the compounds to any particular method of manufacture. When manufactured by the use of an alkylene oxide, it is our preference to use ethylene oxide, propylene oxide, or butylene oxide.

It is to be noted that the sulfato sulfonates and the sulfato sulfonic acids referred to in the claims are surface-active in the same sense that sulfonic acids themselves are surface-active. Furthermore, it is to be noted that some sulfonic acids might be of the polysulfonic acid type, that is, as exemplified by derivatives of disulfonic acids. There is no objection to the use of such raw materials as reactants, and it is obvious that such procedure presents a means by which one obtains an ester in which either one or both terminal hydroxyl radicals may be sulfated.

Having thus described our invention, what we claim as new and desire to secure by Letters Patent is:

1. A process for breaking petroleum emulsions of the water-in-oil type, characterized by subjecting the emulsion to the action of a demulsifier comprising a water-soluble sulfato sulfonate, derived from a polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the linkage:

which in turn is united with a cation; said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

2. A process for breaking petroleum emulsions of the water-in-oil type, characterized by subjecting the emulsion to the action of a demulsifier comprising a water-soluble sulfato sulfonate, derived from an aliphatic polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the linkage:

which in turn is united with a cation; said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

3. A process for breaking petroleum emulsions of the water-in-oil type, characterized by subjecting the emulsion to the action of a demulsifier comprising a neutral water-soluble sulfato sulfonate, derived from an aliphatic polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the linkage:

which in turn is united with a cation; said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble.

4. A process for breaking petroleum emulsions of the water-in-oil type, characterized by subjecting the emulsion to the action of a demulsifier comprising a neutral water-soluble sulfato sulfonate, derived from an aliphatic polyhydric alcohol in which one hydroxy hydrogen atom has been replaced by the acyl radical of a surface-active sulfonic acid having a molecular weight between 200 and 1,000; and another hydroxy hydrogen atom of said polyhydric alcohol has been replaced by the linkage:

which in turn is united with a cation; said compound being further characterized by the fact that the selected sulfonic acid and the selected polyhydric alcohol must be such that the hydroxylated ester derived by replacing one hydroxy hydrogen atom of the aforementioned polyhydric alcohol by the aforementioned acyl radical, is water-insoluble; said anion being selected from the class consisting of sodium, potassium, and ammonium.

5. A process for breaking petroleum emulsions of the water-in-oil type, characterized by subjecting the emulsion to the action of a demulsifier comprising a chemical compound of the kind described in claim 2, with the added proviso that the sulfonic acid must be of the aromatic polyalkylene ether sulfonic acid type.

6. A process for breaking petroleum emulsions of the water-in-oil type, characterized by subjecting the emulsion to the action of a demulsifier comprising a chemical compound of the kind described in claim 2, with the added proviso that the sulfonic acid shall be of the amido sulfonic acid type.

7. A process for breaking petroleum emulsions of the water-in-oil type, characterized by subjecting the emulsion to the action of a demulsifier comprising a chemical compound of the kind described in claim 2, with the added proviso that the sulfonic acid is an aromatic sulfonic acid with alkylene oxyalkyl side chains.

MELVIN DE GROOTE.
BERNHARD KEISER.